(12) United States Patent
Zhao et al.

(10) Patent No.: US 10,929,526 B2
(45) Date of Patent: Feb. 23, 2021

(54) USER INTERFACE FOR TEE EXECUTION OF A DEVICE

(71) Applicants: QUALCOMM Incorporated, San Diego, CA (US); Haijun Zhao, Beijing (CN); Jilei Hou, San Diego, CA (US); Liang Zhang, San Diego, CA (US)

(72) Inventors: Haijun Zhao, Beijing (CN); Jilei Hou, San Diego, CA (US); Liang Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 16/080,200

(22) PCT Filed: Mar. 1, 2016

(86) PCT No.: PCT/CN2016/075204
§ 371 (c)(1),
(2) Date: Aug. 27, 2018

(87) PCT Pub. No.: WO2017/147786
PCT Pub. Date: Sep. 8, 2017

(65) Prior Publication Data
US 2019/0057212 A1 Feb. 21, 2019

(51) Int. Cl.
*G06F 21/53* (2013.01)
*H04L 29/06* (2006.01)
(Continued)

(52) U.S. Cl.
CPC .............. *G06F 21/53* (2013.01); *G06F 21/31* (2013.01); *G06F 21/71* (2013.01); *G06Q 20/382* (2013.01); *G06Q 20/4012* (2013.01); *H04L 29/06* (2013.01)

(58) Field of Classification Search
CPC .......... G06F 21/53; G06F 21/31; G06F 21/71; H04L 29/06; G06Q 20/382; G06Q 20/4012
See application file for complete search history.

(56) References Cited

U.S. PATENT DOCUMENTS 7,302,585 B1 * 11/2007 Proudler ................. G06F 21/84
713/189
7,369,139 B2 * 5/2008 Hancock ................ G09G 5/026
345/422
(Continued)

FOREIGN PATENT DOCUMENTS

CN 103856485 A 6/2014
CN 103942678 A 7/2014
(Continued)

OTHER PUBLICATIONS

International Search Report and Written Opinion—PCT/CN2016/075204—ISA/EPO—dated Nov. 21, 2016.
(Continued)

*Primary Examiner* — J. Brant Murphy
(74) *Attorney, Agent, or Firm* — Thien T. Nguyen (57) ABSTRACT

Aspects of the disclosure are related to a method, apparatus, and system for using display content from a rich operating system (OS) environment as a background image in a trusted user interface (UI), comprising: capturing a display buffer of the rich OS environment; passing the captured display buffer to a Trusted Application; and displaying, with the Trusted Application, the captured display buffer as the background image in the trusted UI, wherein the Trusted Application is executed in a Trusted Execution Environment (TEE).

30 Claims, 5 Drawing Sheets

(51) Int. Cl.
*G06F 21/31* (2013.01)
*G06F 21/71* (2013.01)
*G06Q 20/38* (2012.01)
*G06Q 20/40* (2012.01)

(56) References Cited

U.S. PATENT DOCUMENTS

| | | | | |
|---|---|---|---|---|
| 7,904,730 | B2* | 3/2011 | Proudler | G06F 21/84 |
| | | | | 713/189 |
| 8,266,001 | B2* | 9/2012 | Dierks | G06Q 20/102 |
| | | | | 705/26.2 |
| 8,938,780 | B2* | 1/2015 | Ekdahl | G06F 21/84 |
| | | | | 726/2 |
| 9,104,840 | B1* | 8/2015 | Paczkowski | G06F 21/00 |
| 9,124,419 | B2* | 9/2015 | Bar-El | G06F 21/83 |
| 2005/0275661 | A1* | 12/2005 | Cihula | G06F 21/57 |
| | | | | 345/619 |
| 2008/0022128 | A1* | 1/2008 | Proudler | G06F 21/84 |
| | | | | 713/189 |
| 2013/0263215 | A1* | 10/2013 | Ekdahl | G06F 21/74 |
| | | | | 726/2 |
| 2013/0305041 | A1* | 11/2013 | Bar-El | G06F 21/6281 |
| | | | | 713/156 |
| 2015/0348026 | A1 | 12/2015 | Roberts et al. | |
| 2016/0048840 | A1 | 2/2016 | Lee et al. | |
| 2016/0070932 | A1* | 3/2016 | Zimmer | G06F 21/575 |
| | | | | 713/192 |

FOREIGN PATENT DOCUMENTS

| | | |
|---|---|---|
| CN | 104281947 A | 1/2015 |
| CN | 104462942 A | 3/2015 |
| EP | 2894585 A1 | 7/2015 |
| WO | 2013144051 A1 | 10/2013 |

OTHER PUBLICATIONS

Ahmad Z., et al., "Enhancing the Security of Mobile Application by Using TEE and (U)SIM", 2013 IEEE 10th International Conference on Ubiquitous Intelligence and Computing and 2013 IEEE 10th International Conference on Autonomic and Trusted Computing, Dec. 21, 2013, pp. 575-582, 1-30.

Supplementary European Search Report—16891979.3—Search Authority—City—dated Jul. 19, 2019.

Zhang D., et al., "Secured Trustable Intelligence Mobile Terminal Research Zhongxing Communication Technology", vol. 21, No. 5, Oct. 31, 2015, pp. 39-44, 1-30.

* cited by examiner

USER INTERFACE FOR TEE EXECUTION OF A DEVICE

FIELD

The subject matter disclosed herein relates to electronic devices, and more particularly to methods, apparatuses, and systems for using display content from a rich operating system environment as a background image in a trusted user interface implemented within a trusted execution environment.

BACKGROUNDS

The Trusted Execution Environment (TEE) is a secure area of the main processor of a device (such as a smartphone, a tablet, a set-top box, a smart television, etc.) that guarantees code and data loaded inside will be protected with respect to confidentiality and integrity. The TEE as an isolated execution environment runs in parallel with a rich operating system (OS) such as Android. It provides such security features as isolated execution and integrity of Trusted Applications by using a hybrid approach that utilizes both hardware and software to protect data. Generally speaking, the TEE offers an execution space that provides a higher level of security than the rich OS. Industry associations such as GlobalPlatform have made an effort to standardize specifications for the TEE.

The TEE offers the safe execution of authorized security software, known as "Trusted Applications", enabling it to provide end-to-end security by enforcing protection, confidentiality, integrity, and data access rights. A trusted UI is a specific mode in which a device is controlled by the TEE, enabling it to check that the information displayed on the display screen comes from an approved Trusted Application and is isolated from the rich OS.

Businesses may desire that the users be exposed to their visual identities, e.g., corporate names, trademarks, and/or logos as much as possible in all their interactions with the users. For example, when a user browses the website of an online merchant or uses a mobile application of the online merchant and makes purchases in a rich OS environment, she may see the name and logo of the online merchant being prominently displayed on the website or in the mobile application. Often, the relevant Trusted Application may be provided by a party different from the merchant, such as a payment processor. Thus, when the TEE is invoked to authenticate and finalize the transaction, and the Trusted Application has exclusive control of the device display, the online merchant's name and logo may be missing on the trusted UI.

SUMMARY

One aspect of the disclosure is related to a method for using display content from a rich operating system (OS) environment as a background image in a trusted user interface (UI), comprising: capturing a display buffer of the rich OS environment; passing the captured display buffer to a Trusted Application; and displaying, with the Trusted Application, the captured display buffer as the background image in the trusted UI, wherein the Trusted Application is executed in a Trusted Execution Environment (TEE).

Another aspect of the disclosure is related to an apparatus comprising: a memory; and a processor coupled to the memory, the processor to: capture a display buffer of a rich operating system (OS) environment, pass the captured display buffer to a Trusted Application, and display, with the Trusted Application, the captured display buffer as a background image in a trusted UI, wherein the Trusted Application is executed in a Trusted Execution Environment (TEE).

A further aspect of the disclosure is related to an apparatus for using display content from a rich operating system (OS) environment as a background image in a trusted user interface (UI), comprising: means for capturing a display buffer of the rich OS environment; means for passing the captured display buffer to a Trusted Application; and means for displaying, with the Trusted Application, the captured display buffer as the background image in the trusted UI, wherein the Trusted Application is executed in a Trusted Execution Environment (TEE).

Yet another aspect of the disclosure is related to a non-transitory computer-readable medium comprising code which, when executed by a processor, causes the processor to perform a function comprising: capturing a display buffer of a rich operating system (OS) environment; passing the captured display buffer to a Trusted Application; and displaying, with the Trusted Application, the captured display buffer as a background image in a trusted user interface (UI), wherein the Trusted Application is executed in a Trusted Execution Environment (TEE).

DETAILED DESCRIPTION

As discussed above, the Trusted Execution Environment (TEE) offers the safe execution of authorized security software, known as "Trusted Applications", enabling it to provide end-to-end security by enforcing protection, confidentiality, integrity, and data access rights. Trusted Applications running in a TEE have access to the full power of the device's main processor and memory, while hardware isolation protects these Trusted Applications from applications running in the rich OS. Hardware technologies that can be used to support TEE implementations may include, e.g., the TrustZone technology from ARM. Moreover, software and cryptographic isolation inside the TEE protect the Trusted Applications contained within from each other.

Example use cases for the TEE may include electronic financial service applications, such as mobile wallets, money transfers, bill payments, peer-to-peer payments, or contactless payments, etc. These financial service applications may involve user interactions, and for these applications it is important to guarantee "What You See Is What You Sign." This objective may be achieved by a dedicated Trusted Application running in the TEE that takes over the control of the device display from the rich OS and provides a safe and trusted user interface (UI).

A trusted UI is a specific mode in which a device is controlled by the TEE, enabling it to check that the information displayed on the display screen comes from an approved Trusted Application and is isolated from the rich OS. The trusted UI also enables the information to be securely configured by the end user and securely controlled by the TEE by verifying the UI of the device. Therefore, for example, when a user makes a transaction, a summary of the transaction may be displayed in a new window by the TEE, ensuring that any non-secure applications stored in the rich OS will not be able to tamper with the payment details. The end user is able to sign exactly what is shown on the display screen and authenticate herself by, e.g., entering a personal identification number (PIN) or password. Therefore, the trusted UI ensures that only a specific Trusted Application is able to exchange information through it.

Figure 1:
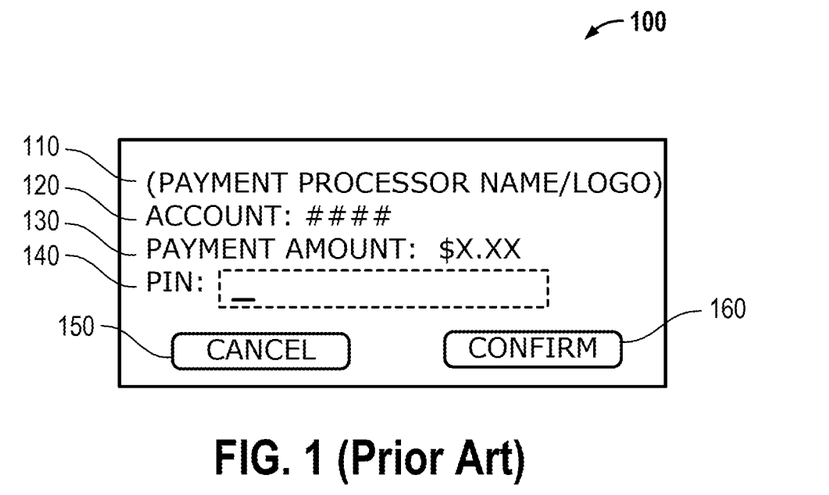
FIG. 1 is an illustration of an example conventional trusted UI display.

Referring to FIG. 1, an illustration of an example conventional trusted UI display 100 is shown. The known, conventional trusted UI display 100 comprises a payment processor name and/or logo 110, an account number 120, an exact payment amount 130, a PIN input box 140, a CANCEL button 150 for canceling the transaction, and a CONFIRM button 160 for confirming the transaction. The user may authenticate herself and finalize the transaction on this trusted UI. The user may have come to this trusted UI display 100 after clicking e.g., a checkout link on an online merchant website or in an online merchant mobile application, which is rendered by a rich OS. As the trusted UI display 100 is provided by a Trusted Application contained in the TEE, and the Trusted Application is provided by the payment processor who has exclusive control over the device display, visual information about the online merchant, such as its name and/or logo, is missing.

Figure 2:
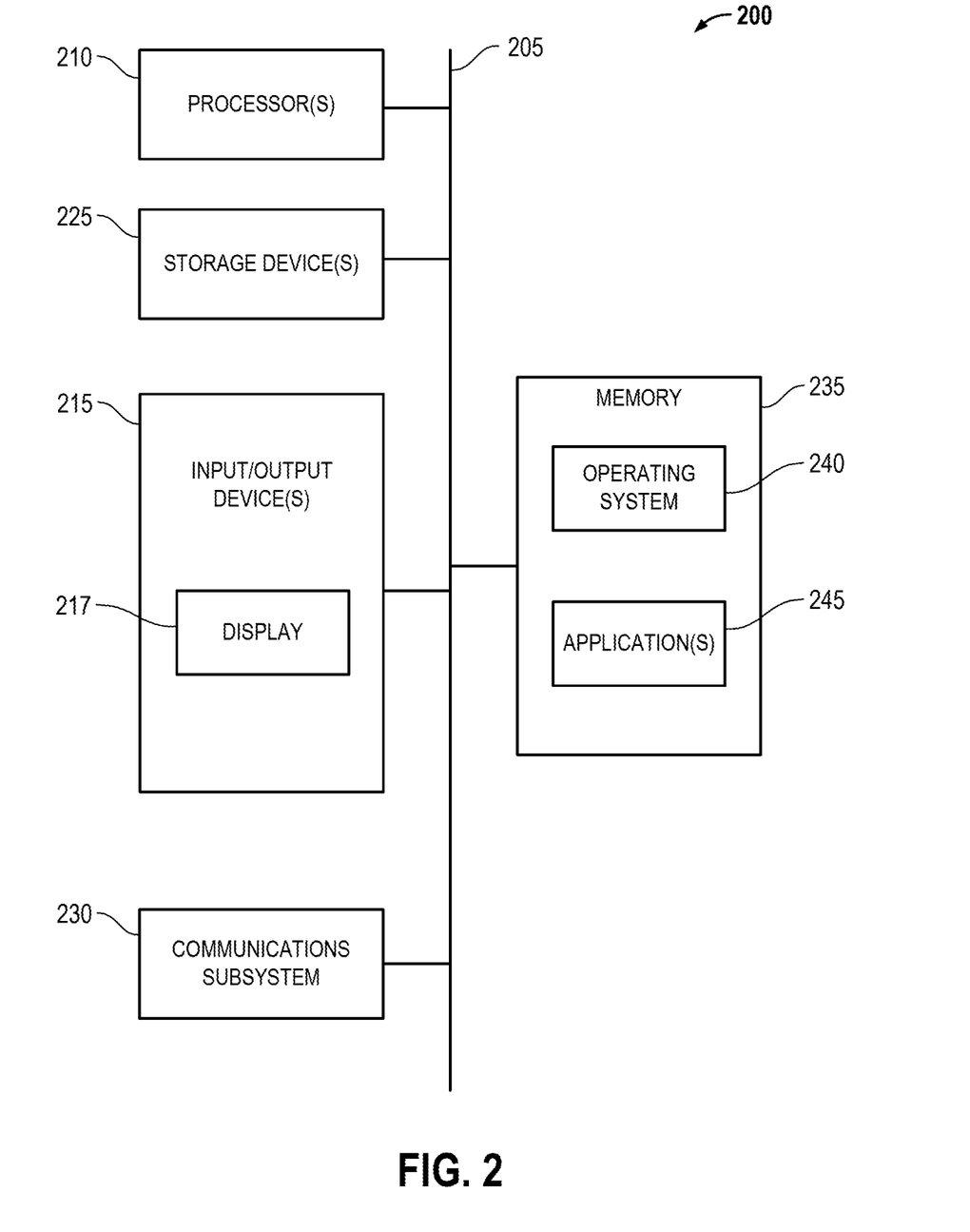
FIG. 2 is diagram illustrating an example device with which embodiments of the disclosure may be practiced.

Referring to FIG. 2, an example device 200 adapted for implementing a TEE is shown. The device 200 is shown comprising hardware elements that can be electrically coupled via a bus 205 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input/output devices 215 including a display 217, a mouse, a keyboard, a speaker, a printer, and/or the like. The processors 210 may comprise a hardware security elements with which a TEE may be implemented.

The device 200 may further include (and/or be in communication with) one or more non-transitory storage devices 225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device 200 might also include a communication subsystem 230, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 230 may permit data to be exchanged with a network, other computer systems/devices, and/or any other devices described herein. In many embodiments, the device 200 will further comprise a working memory 235, which can include a RAM or ROM device, as described above.

The device 200 also can comprise software elements, shown as being currently located within the working memory 235, including an operating system 240, such as a rich OS, device drivers, executable libraries, and/or other code, such as one or more application programs 245, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 225 described above. In some cases, the storage medium might be incorporated within a computer device, such as the device 200. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the device 200 and/or might take the form of source and/or installable code, which, upon compilation and/or installation on the device 200 (e.g., using any of a variety of generally available compilers, installation programs, compression/decompression utilities, etc.), then takes the form of executable code.

One embodiment of the disclosure is directed to an apparatus 200 comprising a memory 235; and a processor 210 coupled to the memory 235, the processor 210 to: capture a display buffer of a rich operating system (OS) environment, pass the captured display buffer to a Trusted Application, and display, with the Trusted Application, the captured display buffer as a background image in a trusted UI, wherein the Trusted Application is executed in a Trusted Execution Environment (TEE).

Figure 3:
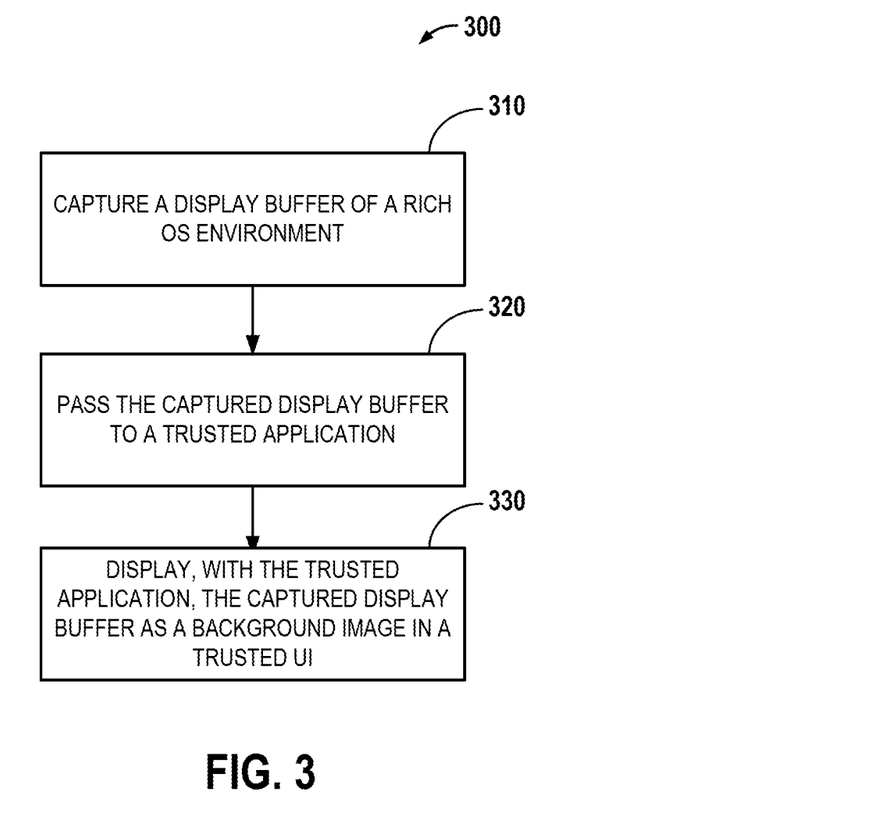
FIG. 3 is a flowchart illustrating an example method for using display content from a rich OS environment as a background image in a trusted UI.
Figure 4:
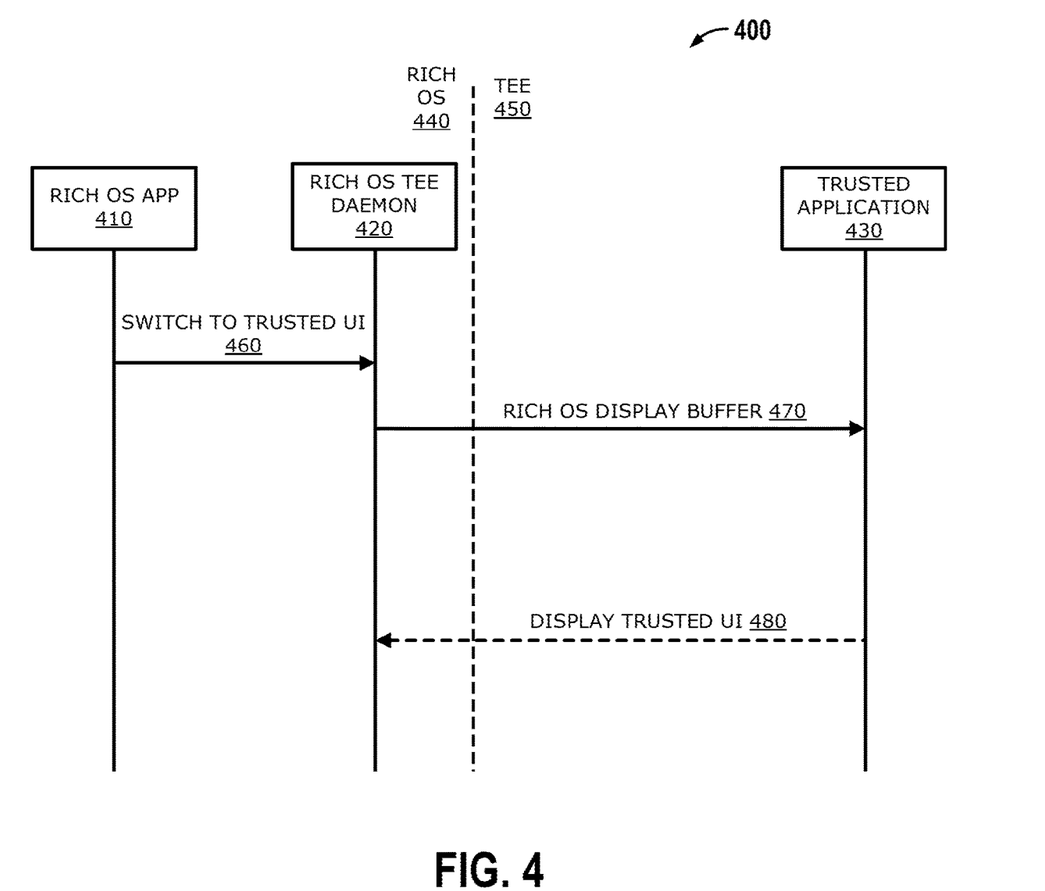
FIG. 4 is a diagram illustrating various elements involved in the method for using display content from a rich OS environment as a background image in a trusted UI.

Referring now to FIGS. 3 and 4, FIG. 3 shows a flowchart illustrating an example method 300 for using display content from a rich OS environment as a background image in a trusted UI. FIG. 4 shows a diagram 400 illustrating various elements involved in the method for using display content from a rich OS environment as a background image in a trusted UI.

At block 310, a processor (e.g., processor 210 of FIG. 2) of a device may capture a display buffer or a rich OS environment. For example, when a user action in a rich OS 440 environment invoking a Trusted Application in the TEE 450 is detected, the current display buffer of the rich OS 440 environment may be captured. Such a user action may include e.g., a user action in a rich OS application 410, such as a click on a checkout button in an online shopping application. It should be appreciated that the display buffer of the rich OS 440 environment may include, e.g., content from the rich OS application 410, such as the merchant's name and/or logo associated with the shopping application and other merchant content. In one aspect, upon detection of the user action in a rich OS 440 environment invoking the Trusted Application in the TEE 450, the processor may switch to a trusted UI as shown in 460 (FIG. 4).

At block 320, the processor may pass the captured display buffer to a trusted application. For example, the captured display buffer of the rich OS 440 environment may be passed to the invoked Trusted Application 430 as shown in 470 (FIG. 4). In one aspect, the captured display buffer may be passed via a rich OS TEE daemon 420 that serves as an intermediary between the rich OS 440 and the TEE 450.

At block 330, the processor may display, with the trusted application, the captured display buffer as a background image in a trusted UI on a display of the device (e.g., display 217 of FIG. 2). For example, the captured display buffer of the rich OS 440 environment may be displayed as a background image in the trusted UI of the invoked Trusted Application 430 as shown in 480 (FIG. 4). The trusted UI of the Trusted Application 430 may be displayed using methods conventional to TEE 450 implementations, which may include passing of display content from the Trusted Application 430 to the rich OS TEE daemon 420.

Within the trusted UI, the secure content, such as a payment authorization and confirmation window, may be superimposed on the background image while occupying a smaller area than the total display area. Consequently, part of the background image may remain visible to the user. Visual effects such as shading may be applied to the background image so as not to obscure the more important secure content. Therefore, what was displayed in the rich OS environment before the switch over to the TEE 450, such as merchant name/logo and/or other content, may remain visible together with the secure content even if the Trusted Application 430 is provided by a different party, such as a payment processor.

Figure 5:
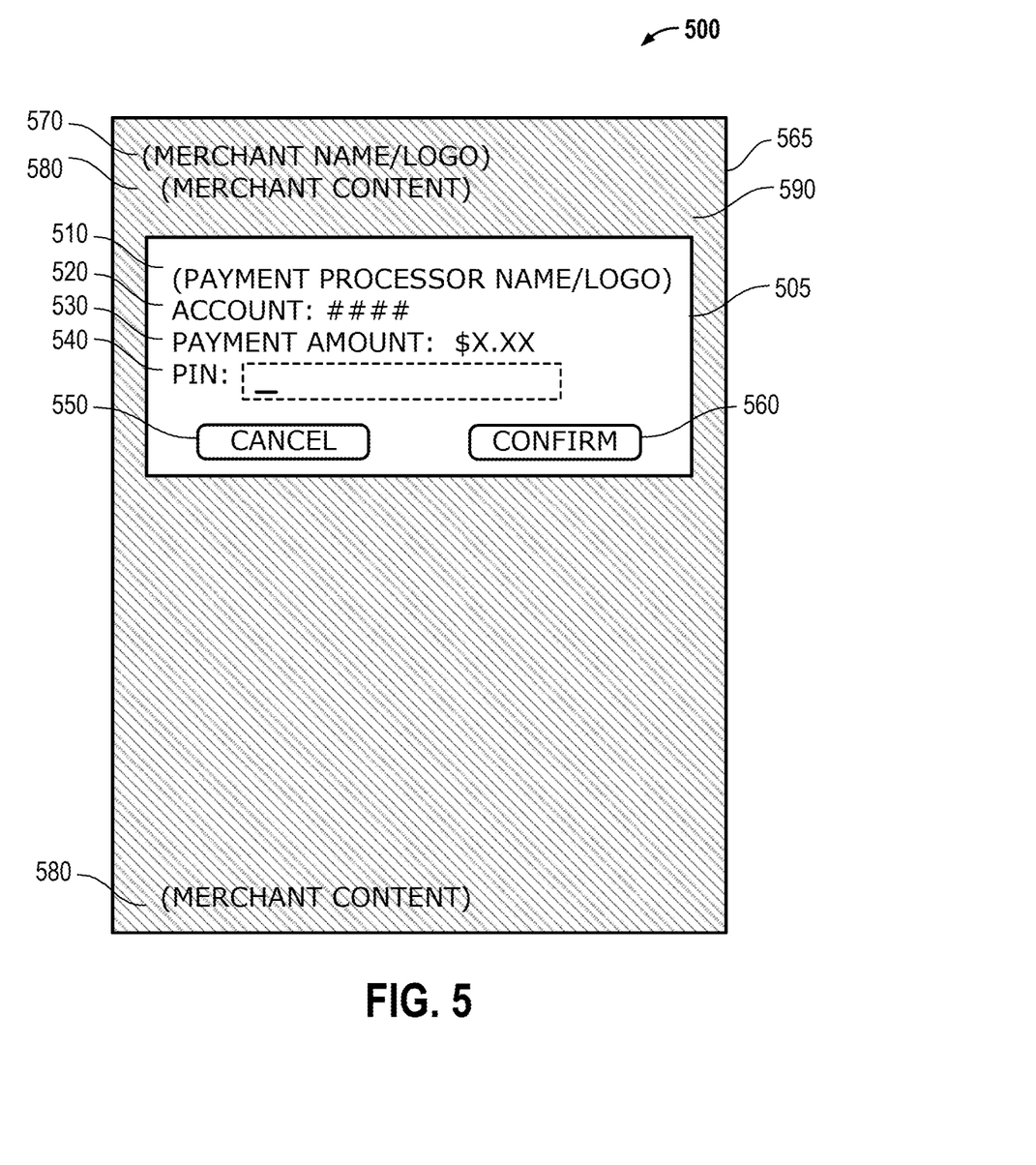
FIG. 5 is an illustration of an example trusted UI display with display content from a rich OS environment as a background image.

Referring to FIG. 5, an illustration of an example trusted UI display 500 with display content from a rich OS environment as a background image is shown. The secure content window 505 may be similar to the conventional trusted UI display 100 of FIG. 1, and may include a payment processor name and/or logo 510, an account number 520, an exact payment amount 530, a PIN (or password) input box 540, a CANCEL button 550 for canceling the transaction, and a CONFIRM button 560 for confirming the transaction. Outside the secure content window 505 a background image 565 may be seen, which may be a screen copy of the content displayed in the rich OS environment before the Trusted Application was invoked. Visual effects such as shading 590 may be applied to the background image 565 so as not to obscure the more important secure content window 505. In the background image 565, a merchant's name/logo 570 and some other merchant content 580 may be seen.

Therefore, embodiments of the disclosure enable the display of a device to display content from a rich OS environment as a background image in a trusted UI of a Trusted Application executed in the TEE. Therefore, business visual identity, such as an online merchant's name/logo and/or other merchant content may be viewable by the user while the user operates within the trusted UI. This is possible even if the Trust Application is provided by a party different from the merchant, such as a payment processor.

Various implementations of an apparatus, method, and system for using display content from a rich OS environment as a background image in a trusted UI implemented with a TEE have been previously described in detail. It should be appreciated that application or system that completes the relevant operations may be implemented as software, firmware, hardware, combinations thereof, etc. In one embodiment, the previous described functions may be implemented by one or more processors (e.g., processor 210) of a device 200 to achieve the previously desired functions (e.g., the method operations of FIG. 3). Using display content from a rich OS environment as a background image in a trusted UI may provide or improve visibility of the visual identity of a business even if the Trusted Application is provided by a party different from the business.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for using display content from a rich operating system (OS) environment as a background image in a trusted user interface (UI), comprising:
   capturing a display buffer of the rich OS environment;
   passing the captured display buffer to a Trusted Application; and
   displaying, with the Trusted Application, the captured display buffer as the background image in the trusted UI,
   wherein the Trusted Application is executed in a Trusted Execution Environment (TEE).

2. The method of claim 1, wherein the capturing the display buffer is responsive to a detection of an invocation of the Trusted Application.

3. The method of claim 1, wherein the captured display buffer comprises a merchant's name or logo.

4. The method of claim 3, wherein the Trusted Application is provided by a party different from the merchant.

5. The method of claim 3, wherein the trusted UI comprises a payment authorization window smaller than a total display area and superimposed on the background image, and wherein the merchant's name or logo is at least partially visible.

6. The method of claim 5, wherein the payment authorization window comprises at least one of an account number, a payment amount, or a personal identification number (PIN) or password input field.

7. The method of claim 1, further comprising applying a shading visual effect to the background image in the trusted UI.

8. The method of claim 1, wherein the captured display buffer is passed to the Trusted Application via a rich OS TEE daemon.

9. An apparatus, comprising:
   a memory;
   a display; and
   a processor coupled to the memory, the processor to:
     capture a display buffer of a rich operating system (OS) environment,
     pass the captured display buffer to a Trusted Application, and
     display, with the Trusted Application, the captured display buffer as a background image in a trusted UI on the display,
     wherein the Trusted Application is executed in a Trusted Execution Environment (TEE).

10. The apparatus of claim 9, wherein the capturing the display buffer is responsive to a detection of an invocation of the Trusted Application.

11. The apparatus of claim 9, wherein the captured display buffer comprises a merchant's name or logo.

12. The apparatus of claim 11, wherein the Trusted Application is provided by a party different from the merchant.

13. The apparatus of claim 11, wherein the trusted UI comprises a payment authorization window smaller than a total display area and superimposed on the background image, and wherein the merchant's name or logo is at least partially visible.

14. The apparatus of claim 13, wherein the payment authorization window comprises at least one of an account number, a payment amount, or a personal identification number (PIN) or password input field.

15. The apparatus of claim 9, wherein the processor is to further apply a shading visual effect to the background image in the trusted UI.

16. The apparatus of claim 9, wherein the captured display buffer is passed to the Trusted Application via a rich OS TEE daemon.

17. An apparatus for using display content from a rich operating system (OS) environment as a background image in a trusted user interface (UI), comprising:
   means for capturing a display buffer of the rich OS environment;
   means for passing the captured display buffer to a Trusted Application; and
   means for displaying, with the Trusted Application, the captured display buffer as the background image in the trusted UI,
   wherein the Trusted Application is executed in a Trusted Execution Environment (TEE).

18. The apparatus of claim 17, wherein the capturing the display buffer is responsive to a detection of an invocation of the Trusted Application.

19. The apparatus of claim 17, wherein the captured display buffer comprises a merchant's name or logo.

20. The apparatus of claim 19, wherein the Trusted Application is provided by a party different from the merchant.

21. The apparatus of claim 19, wherein the trusted UI comprises a payment authorization window smaller than a total display area and superimposed on the background image, and wherein the merchant's name or logo is at least partially visible.

22. The apparatus of claim 21 wherein the payment authorization window comprises at least one of an account number, a payment amount, or a personal identification number (PIN) or password input field.

23. The apparatus of claim 17, further comprising means for applying a shading visual effect to the background image in the trusted UI.

24. A non-transitory computer-readable medium comprising code which, when executed by a processor, causes the processor to perform a function comprising:
   capturing a display buffer of a rich operating system (OS) environment;
   passing the captured display buffer to a Trusted Application; and
   displaying, with the Trusted Application, the captured display buffer as a background image in a trusted user interface (UI),
   wherein the Trusted Application is executed in a Trusted Execution Environment (TEE).

25. The non-transitory computer-readable medium of claim 24, wherein the capturing the display buffer is responsive to a detection of an invocation of the Trusted Application.

26. The non-transitory computer-readable medium of claim 24, wherein the captured display buffer comprises a merchant's name or logo.

27. The non-transitory computer-readable medium of claim 26, wherein the Trusted Application is provided by a party different from the merchant.

28. The non-transitory computer-readable medium of claim 26, wherein the trusted UI comprises a payment authorization window smaller than a total display area and superimposed on the background image, and wherein the merchant's name or logo is at least partially visible.

29. The non-transitory computer-readable medium of claim 28, wherein the payment authorization window comprises at least one of an account number, a payment amount, or a personal identification number (PIN) or password input field.

30. The non-transitory computer-readable medium of claim 24, further comprising code for applying a shading visual effect to the background image in the trusted UI.

* * * * *